US005338603A

United States Patent [19]

Mahn, Sr. et al.

[11] Patent Number: 5,338,603

[45] Date of Patent: Aug. 16, 1994

[54] ORNAMENTAL TRANSFER SPECIALLY ADAPTED FOR ADHERENCE TO NYLON

[76] Inventors: John E. Mahn, Sr., 6154 Oakhaven Dr., Cincinnati, Ohio 45238; John E. Mahn, Jr., 5878 Valleyway Ct., Cincinnati, Ohio 45247

[21] Appl. No.: 547,338

[22] Filed: Jul. 2, 1990

Related U.S. Application Data

[63] Continuation of Ser. No. 218,709, Jul. 13, 1988, abandoned.

[51] Int. Cl.[5] .......................... C09J 7/02; C09J 167/02

[52] U.S. Cl. .................................... 428/349; 428/355; 428/475.2; 428/475.5; 428/480

[58] Field of Search ...................... 428/349, 354, 475.5, 428/480, 482, 483, 355, 475.2

[56] References Cited

U.S. PATENT DOCUMENTS

| | | | |
|---|---|---|---|
| 3,226,276 | 12/1965 | Rye et al. | 156/910 X |
| 3,307,966 | 3/1967 | Shoaf | 156/910 X |
| 3,360,212 | 5/1972 | Liebe, Jr. | 428/190 X |
| 3,657,060 | 4/1972 | Haigh | 156/309 |
| 4,269,885 | 5/1981 | Mahn | 428/200 X |
| 4,390,387 | 6/1983 | Mahn | 428/214 X |
| 4,610,904 | 9/1986 | Mahn, Sr. et al. | 428/914 X |
| 4,751,120 | 6/1988 | Yazaki et al. | 428/482 X |

FOREIGN PATENT DOCUMENTS

| | | |
|---|---|---|
| 1480860 | of 1967 | France . |
| WO7901146 | of 1979 | PCT Int'l Appl. . |
| 1447049 | 8/1976 | United Kingdom . |

*Primary Examiner*—Jenna L. Davis

[57] ABSTRACT

An ornamental heat transfer is described which is especially adapted for application to nylon fabrics. The ornamental heat activated transfer includes an upper layer which is generally a thermoset layer, cloth such as twill or flock which is bonded to a lower layer. The lower layer is an uncured linear saturated polyester film which includes a heat activatable isocyanate curing agent. Upon application of the transfer to nylon the transfer is heated which melts the uncured saturated polyester and activates the curing agent. Thus while the linear saturated alkyl polyester is in a molten state the curing agent causes the polyester to cure in tight confinement with the nylon fabric.

9 Claims, 1 Drawing Sheet

ORNAMENTAL TRANSFER SPECIALLY ADAPTED FOR ADHERENCE TO NYLON

This application is a continuation of application Ser. No. 218,709, filed Jul. 13, 1988 now abandoned.

Ornamental transfers and indicia presenting heat activated decoratives are well known and are typically applied to cloth and other substrates particularly clothing. These decoratives particularly heat activated decoratives are used to provide numbers on sports jerseys, names on shirts and company logos on uniforms.

There are several types of heat activated transfers. These generally have a heat softenable adhesive layer which bonds to a cloth substrate. A second upper layer is formed of a variety of different materials including thermoplastics, thermosets, flocks, plastisols, cloth (woven and unwoven) and the like. In other applications, thread in the form of an embroidered letter can be the upper layer with an adhesive layer on the bottom. These are all applied to a substrate by heat, pressure and time sufficient to melt the adhesive layer and permit penetration of the melted adhesive into the surface of a garment.

There are many different types of transfers disclosed in the literature. For example, Liebe U.S. Pat. No. 3,660,212 discloses a heat activated transfer formed of a polyvinyl chloride lower layer and a surface layer of a cross-linked polyvinyl chloride plastisol. The plastisol is highly pigmented and acts as an ink.

Another decorative is disclosed in Mahn U.S. Pat. No. 4,390,387. This patent discloses a flocked decorative with a lower thermoplastic layer. Further, Mahn U.S. Pat. No. 4,610,904 discloses a heat activated removable ornamental transfer which includes a lower thermoplastic layer and an upper continuous layer of a thermoset material. The upper layer is preferably a thermoset ink. Mahn, U.S. Pat. No. 4,269,885 discloses a heat transfer formed of a polyurethane upper layer bonded to a thermoplastic polyester lower layer.

Embroideries which have a thermoplastic layer are usually formed by stitching thread onto a scrim fabric. The thermoplastic layer is then laminated thereto. This is applied to a garment by applying heat and pressure directly against the threading which in turn heats up the thermoplastic layer allowing it to be applied to a substrate. Further, U.S. patent application Ser. No. 041,866 entitled "Method of Applying Heat Activated Transfer and Article" filed Apr. 23, 1987 discloses a heat activatable transfer wherein the indicia layer is a discontinuous indicia bearing layer and the thermoplastic layer is a continuous thermoplastic layer. It is applied to a garment with blotting paper between the indicia bearing layer and the heat source. Heating the blotting paper in turn heats the thermoplastic material and excess thermoplastic material is absorbed by the blotting paper.

All of these heat activated transfers are applied to a substrate which does not melt during application and to which the adhesive is adherent or coherent. These work for most materials.

Nylon is the very notable exception. Due to its close tight weave it is very difficult for the adhesive to penetrate the weave to form a good bond. Due to the chemical make up of the nylon the generally used adhesives do not adequately wet the surface of the nylon to provide a good adhesive bond. Nor do these adhesives form any chemical bond between the nylon and the adhesive.

The adhesives generally used in heat activated indicia include polyurethanes, polyvinyl chloride, polyolefins such as polyethylene and polypropylene and thermoplastic polyester.

These adhesives generally must be capable of forming a non-tacky film which upon application of heat are melted to become tacky. Previously used adhesives for adhering indicia bearing ornamentals are unsuitable for nylon. This has necessitated in many applications physically sewing the material onto the nylon. This is very expensive and greatly increases the cost of many nylon jackets.

Other nylon materials are simply printed with an ink such as a vinyl plastisol type of ink. This ink generally crumbles off after a period of time and is not capable of withstanding dry cleaning.

SUMMARY OF THE INVENTION

Accordingly it is an object of the present invention to provide a heat activated ornamental indicia bearing transfer which is suitable for application to nylon. Further it is an object of the present invention to provide such an ornamental transfer which can be in the form of a wide variety of different transfers including those having upper polyurethane layers, cloth layers, twill layers, polyvinyl chloride layers, flock and the like.

The present invention is premised on the realization that an ornamental transfer formed from an upper indicia bearing layer and a lower layer formed from a linear saturated polyester incorporating a heat activated curing agent will adhere and remain adhered to nylon. Preferably, the curing agent is an isocyanate type curing agent and is provided in sufficient amount to at least partly cross-link the polyester causing it to adhere to nylon.

The invention is further premised on the realization that such an ornamental transfer can be formed by applying such a linear saturated polyester dissolved in an appropriate solvent onto an indicia bearing film such as polyurethane or the like allowing the solvent to dissolve leaving a film of the polyester on the indicia bearing layer. The polyester is at least partially thermosettable. This can then be stored for prolonged period of time.

It is applied to a substrate such as nylon by placing the ornamental transfer onto the substrate with the polyester layer adjacent the substrate, applying heat and pressure sufficient to cause the polyester layer to melt. This heat in turn activates the isocyanate curing agent. Upon cooling, the polyester solidifies and forms a weak bond to the nylon. The polyester cures or crosslinks over a 24 hour period. The curing of the polyester adjacent the nylon then keeps the ornamental transfer in position.

As will be described hereafter, this can be used in various manners to form many different types of heat activated transfers where the indicia bearing layer can be one of a variety of different substrates.

The objects and advantages of the present invention will be further appreciated in light of the following detailed description and drawings in which:

DETAILED DESCRIPTION OF THE INVENTION

Figure 1:
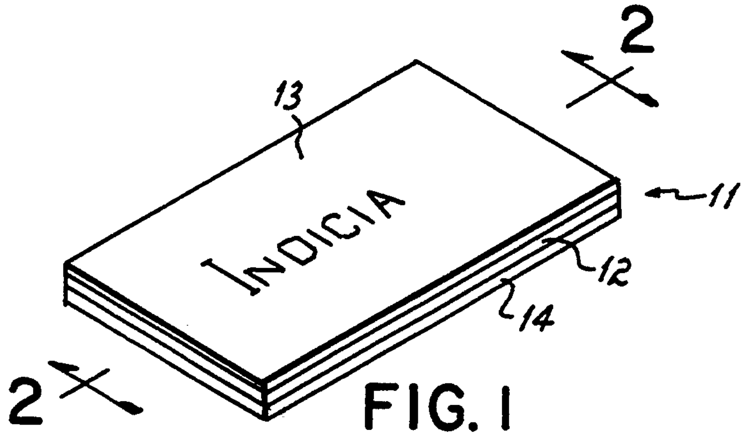
FIG. 1 is a perspective view of an ornamental transfer according to the present invention.
Figure 2:
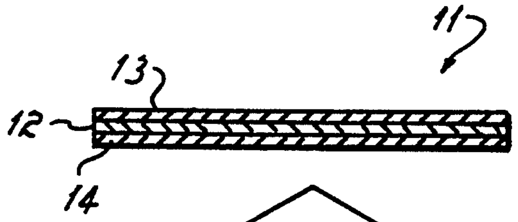
FIG. 2 is a cross-sectional view taken on lines 2—2 of FIG. 1.

The present invention includes two layers, an upper indicia bearing layer and a lower adhesive layer. The upper indicia bearing layer can be formed from a variety of different heat resistant materials which are not destroyed at application temperatures. The upper layer generally remains solid at the softening temperature of the adhesive layer. Although a thermoplastic urethane which melts at application temperature but is not destroyed can be used. Preferably the upper layer is a thermoplastic urethane, thermoset plastic material, flock, or woven material such as twill edge sewn letters (with or without a PVC layer), puff ink and embroideries.

A thermoset plastic is a resin which in its final state is substantially infusible and insoluble. Thermosetting resins often liquid at some state in their manufacture or process are cured by heat catalysis or other chemical means. After being fully cured, thermosets cannot be resoftened by heat.

Thermosets include those plastics which are normally thermoplastic but which are made thermosetting by means of cross-linking with other materials such as cross-linked polyolefins.

Suitable thermoset upper layers include polyamides, thermoset polyurethanes, thermoset polyolefins, thermoset polyepoxides and thermoset polyesters. A preferred thermoset is a thermoset polyurethane ink such as Zephrylon pigmented polyurethanes sold by Sinclair and Valentine Chemical Coatings Group of Wheelabrator-Frye, Inc. of North Kansas City, Mo. This is disclosed more fully in Mahn U.S. Pat. No. 4,610,904.

Further the upper indicia bearing layer may be a vinyl plastisol such as disclosed in the Liebe Jr. U.S. Pat. No. 3,660,212 patent or a flock material such as disclosed in the Mahn U.S. Pat. No. 4,390,387. A suitable thermoplastic polyurethane is disclosed in Mahn U.S. Pat. No. 4,269,885.

Further the upper indicia bearing layer can be a woven material for example cotton. Other non-woven webs can be used as indicia bearing layer presuming they are not destroyed at application temperatures as described below. Twill such as edge sewn twill letters can be the upper indicia bearing layer. Also embroidered letters are suitable.

The adhesive layer is a thermosettable film of a linear saturated polyester polymer which includes a heat activated curing agent. The uncured polyester itself is a linear alkyl saturated polyester formed by reacting a glycol with a diacid. The molecular weight of the uncured polyester polymer must be low enough to flow and wet the surface of the nylon at application temperature, i.e., generally about less than 450° F. Preferably it should be from about 5 to 30,000 and most preferably about 10 to 15,000. The polyester adhesive should include a heat activated curing agent and preferably a heat activated polyisocyanate curing agent.

Specifically suitable diols include ethylene glycol, propylene glycol, 1,3-propane diol, 1,4-butane diol, 1,5-pentane diol, 1,6-hexane diol, 1,8-octane diol, 1,4-cyclohexanedimethanol, 1,3-cyclohexanedimethanol, diethylene glycol and the like.

Useful diacids for making these polyesters would include aromatic dicarboxylic acids having no vinyl saturation such as isophthalic acid or anhydride, phthalic acid or anhydride, terephthalic acid or aliphatic dicarboxylic acids such as adipic acid, succinic acid, gluteric acid and the like.

The heat activated curing agent must act to cure the polyester upon heating. It should be a heat activated curing agent since these ornamentals must have a shelf life of several months. The heat activated curing agent can be an isocyanate curing agent preferably a blocked isocyanate curing agent. Suitable such curing agents include phenol blocked methylene bis-4-phenylisocyanate such as those disclosed in U.S. Pat. No. 3,307,966 and phenolaldehyde blocked polyisocyanates such as those discussed in U.S. Pat. No. 3,226,276. Other blocked isocyanates include dimerized toluene diisocyanates and methylethyl-ketoxime blocked polyisocyanates. Methods of forming such polyesters are well known and are disclosed in U.S. Pat. No. 4,350,807, 3,898,358, 4,606,785 and 4,215,516.

A preferred adhesive for use in the present invention is Bostik adhesive 10-300-3 which is a thermosetting linear saturated polyester adhesive using an isocyanate curing agent and a polyester formed from ethylene glycol and methylterphthalic acid. This is dissolved in methylethyl ketone and methylene chloride and this has a weight average molecular weight of 10–15,000.

Ornamental transfers can be made in various manners as described hereinafter. As shown in FIG. 1 the ornamental transfer 11 will include the lower polyester layer 12 laminated to the upper layer 13. An optional release layer 14 is included adjacent the polyester layer.

To form this transfer, the polyester adhesive dissolved in a solvent is coated onto the release layer 14 and dried at from about 250°–325° F. (121°–163° C.). The upper layer 13 is then film coated onto the polyester layer 12. If the upper layer is a moisture cure polyurethane, the polyurethane is coated onto the solidified polyester layer 12. If the upper layer is thermoplastic, it can be formed into a film and laminated onto the polyester layer 12 before it's solvent completely evaporates. The two films can also be laminated together under slight heat and pressure.

Figure 3:
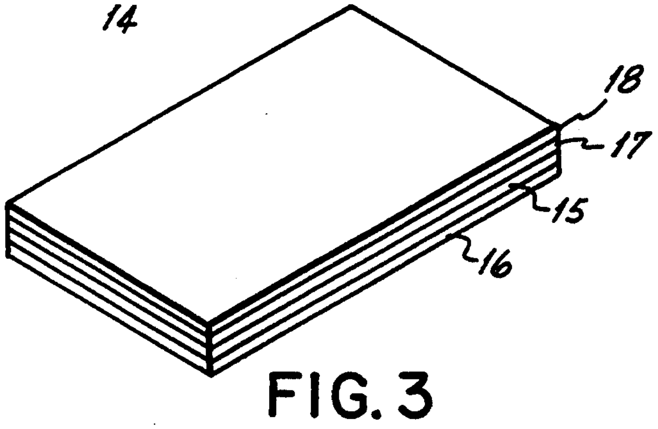
FIG. 3 is a perspective view of an alternate embodiment of the present invention.
Figure 4:
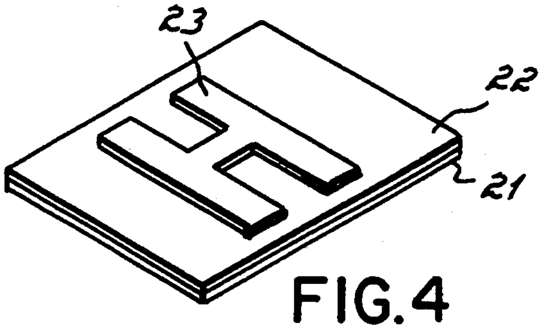
FIG. 4 is a perspective view of an alternate embodiment of the present invention.

As shown in FIG. 3, it is also desirable in certain situations to use an intermediate layer. In this embodiment the polyester layer 15 is coated onto a release layer 16 and the solvent evaporated. A PVC layer 17 can be bonded intermediate the polyester layer 15 and an upper layer 18 which for example can be twill or other cloth or even flock. Again, the layers are laminated together under slight heat and pressure.

An ornamental decorative can also be made according to the method described in U.S. patent application Ser. No. 041,866 filed Apr. 22, 1987 wherein the release sheet 21 is coated with the polyester layer 22 where the polyester layer is a continuous layer. A discontinuous indicia bearing layer such as a discrete letter 23 is then coated onto the polyester layer 22. This is applied to a substrate using blotting paper.

In these applications, various coating methods can be used depending on the particular indicia bearing layer. Preferably, the polyester adhesive is applied, dissolved in a solvent and allowed to dry at a temperature below its curing temperature to dry off the solvent forming a solid film. The film can also be extruded from solid pellets.

The ornamental transfer is then applied to a substrate particularly nylon by placing the polyester layer against the nylon layer, applying heat and pressure against the ornamental transfer, melting the polyester layer and causing it to soak into or migrate towards the nylon. Nylon is the generic name for long chain polyamides which have recurring amide groups as an integral part of the main polymer chain. Generally nylon fabrics are nylon 6/6 which is made by condensing hexamethylenediamine with adipic acid.

The application temperature should be above the cure temperature of the polyester (i.e., activation temperature of the curing agent) generally above 325° F., generally at around 350°–400° F. At these temperatures, the polyester film melts and the curing agent is activated. Pressure from the heat source forces the molten polyester to flow into the nylon. This is allowed to cool forming a weak bond with the nylon. The curing agent then acts to at least partially cure the polyester forming a firm bond to the polyester.

When applied to nylon in this manner the decorative heat transfer remains adhered to the nylon for prolonged periods of time inspite of washing and other normal use.

To compare the heat decorative transfer of the present invention with other heat decorative transfers, a heat transfer made according to the present invention was formed having a 3 mil thick film of the Bostik-10-300-3 adhesive. Coated over this was one mil of thermoset polyurethane ink made by Zephrylon. This was applied to a piece of nylon fabric at a temperature of 350° F. for 5 seconds (about 5 psi) and allowed to set over a period of 24 hours. After 24 hours, the peel strength of the transfer onto the nylon fabric was 10–14 pounds per square inch.

A heat decorative transfer made according to the method disclosed in U.S. Pat. No. 4,269,885 having a polyurethane thermoplastic upper layer and a thermoplastic polyester lower layer was applied to nylon at 350° F. at 6 seconds and allowed to set. Its peel strength was less than one pound per square inch. In both of these tests, the nylon was substantially the same and can be described as follows: tightly woven nylon, 150 warp and weave, 2 denier which is typically used for outerwear (windbreakers).

Thus, when using a decorative heat transfer according to the present invention, one obtains a very substantial bond between nylon and an indicia bearing layer. The bond strength, 10–14 pounds per square inch, is considered excellent. Thus, the present invention provides the first heat activated decorative transfer which can be applied to nylon. Due to the fact that the polyester adhesive can be laminated to a wide variety of different thermoplastic and thermoset materials as well as woven and nonwoven webs made from a variety of different materials including polyesters, cotton and other natural fabrics and wool, this can be used for a wide variety of different applications and provide substantial cost savings and eliminating the need to sew many indicia bearing transfers onto nylon jackets.

Heat activated transfer of the present invention can be used for many applications such as nylon including highly sized garments such as Lycra brand nylon and even clean room garments which are 100% polyester having interwoven carbon fibers to prevent static.

The preceding has been a description of the preferred embodiment of the present invention along with the best mode of practicing the invention known at this time. However, the present invention is limited only by the pendent claims wherein we claim:

I claim:

1. An ornamental heat transfer comprising an upper indicia bearing layer bonded to a second layer, said second layer comprising thermosettable uncured linear saturated polyester in combination with a heat activated curing agent wherein said heat activated curing agent is a blocked isocyanate said transfer being heat bondable to a woven nylon having 150 warp and weave to form a bond.

2. The ornamental heat transfer claimed in claim 1 wherein said uncured linear saturated polyester has a molecular weight from about 5,000 to about 30,000.

3. The ornamental heat transfer claimed in claim 1 wherein said linear saturated polyester is a reaction product of a glycol and a terphthalate.

4. The ornamental heat transfer claimed in claim 3 wherein said glycol is ethylene glycol and said terephthalate is dimethyl terephthalate.

5. The ornamental transfer claimed in claim 1 wherein said indicia bearing layer is twill.

6. The ornamental heat transfer claimed in claim 5 wherein said twill is bonded to a layer of polyvinyl chloride which is in turn bonded to said linear saturated polyester.

7. The ornamental heat transfer claimed in claim 1 wherein said indicia bearing layer comprises thermoset polyurethane.

8. The ornamental heat transfer claimed in claim 1 wherein said indicia layer comprises a discontinuous layer and said second layer of linear saturated polyester is a continuous film.

9. The ornamental heat transfer claimed in claim 1 wherein said indicia comprises a plurality of different symbols printed onto said second layer of linear saturated polyester.

* * * * *